L. M. EGBERT.
VEHICLE WHEEL LOCK.
APPLICATION FILED FEB. 5, 1919.
1,361,756. Patented Dec. 7, 1920.
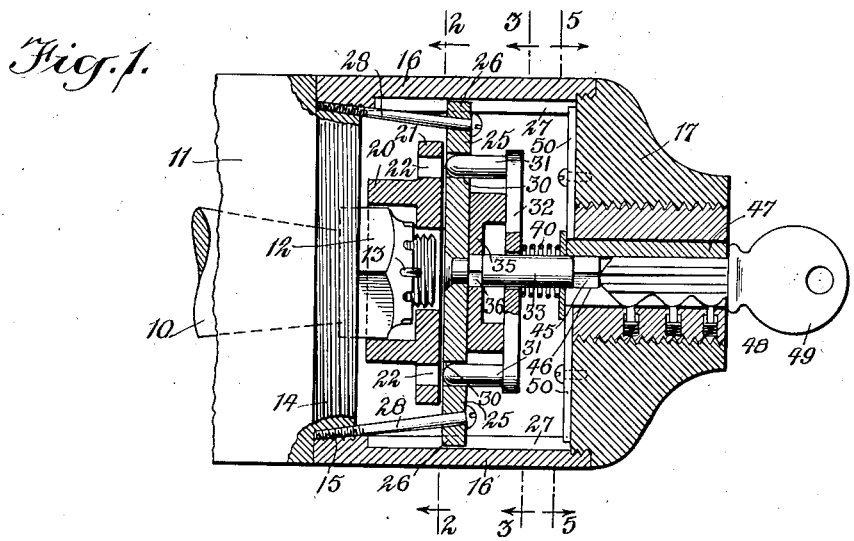
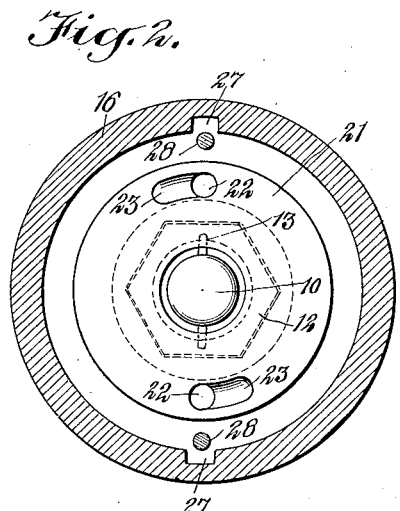
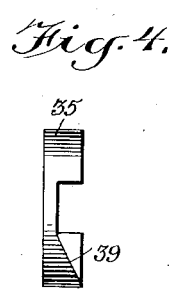
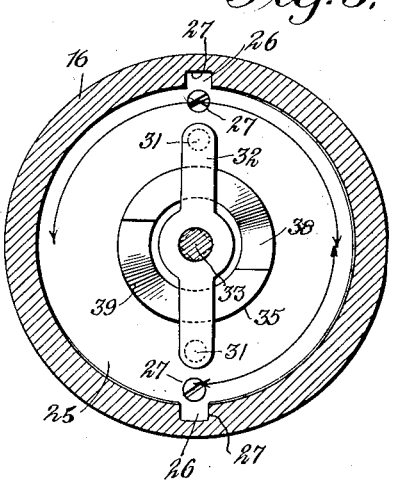
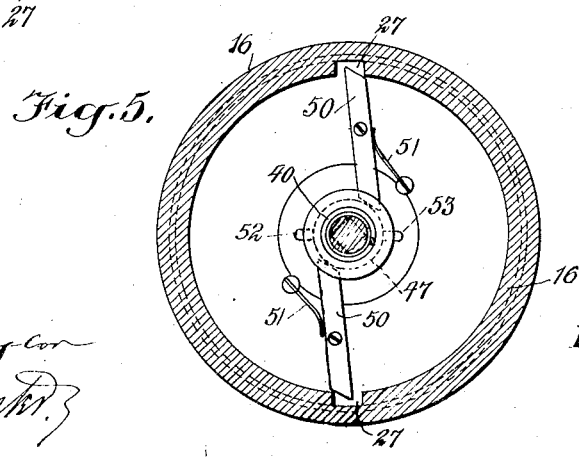
WITNESSES
INVENTOR
Louis M. Egbert
BY Munn & Co
ATTORNEYS

UNITED STATES PATENT OFFICE.

LOUIS MOREFORD EGBERT, OF ELIZABETH, NEW JERSEY, ASSIGNOR OF ONE-HALF TO FRED M. RISLEY, OF ELIZABETH, NEW JERSEY.

VEHICLE-WHEEL LOCK.

1,361,756.   Specification of Letters Patent.   Patented Dec. 7, 1920.

Application filed February 5, 1919. Serial No. 275,064.

*To all whom it may concern:*

Be it known that I, LOUIS M. EGBERT, a citizen of the United States, and a resident of Elizabeth, in the county of Union and State of New Jersey, have invented a new and Improved Vehicle-Wheel Lock, of which the following is a full, clear, and exact description.

The object of the invention is to provide a new and improved vehicle wheel lock more especially designed for use on wheels of automobiles, auto-trucks and other vehicles, and arranged to enable the person in charge of the vehicle to readily lock the wheel to the axle to prevent rotation of the wheel and thus safeguard the vehicle against being stolen. Another object is to provide a vehicle lock which can be readily applied to wheels of vehicles as now generally in use. Another object is to provide a wheel lock which is simple and durable in construction and not liable to get easily out of order.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a longitudinal central section of the improved lock in position in the dust cap of a vehicle wheel hub;

Fig. 2 is a transverse section of the same on the line 2—2 of Fig. 1;

Fig. 3 is a similar view of the same on the line 3—3 of Fig. 1;

Fig. 4 is a side elevation of the bolt controller; and

Fig. 5 is a cross section of the wheel lock on the line 5—5 of Fig. 1.

On the axle 10 of a vehicle is mounted to turn a hub 11 held in place by a nut 12 screwing on the outer end of the axle and locked thereto by a suitable locking device 13 to prevent accidental unscrewing of the nut 12. The hub 12 is provided with a reduced threaded portion 14 on which screws the inner threaded end 15 of a dust cap 16 in the form of a cylinder or band closed at its outer end by a plug 17 screwing in the outer end of the cap 16, as plainly shown in Fig. 1.

The axle nut 12 is of polygonal shape and onto it fits a similarly shaped keeper 20 provided with an annular flange 21 having bolt holes 22, preferably two in number, and disposed diametrically opposite each other, as plainly indicated in Fig. 2. Grooves 23 formed in the face of the flange 21 lead to the bolt holes 22, the said grooves being segmental in shape, as plainly indicated in Fig. 2. In front of the flange 21 of the keeper 20 is arranged a guide plate 25 provided at its peripheral edge with lugs 26 fitting into lengthwise extending grooves 27 formed in the inner surface of the dust cap 16 (see Figs. 1, 3 and 5), to hold the guide plate 25 from turning within the dust cap. Screws 28 extend through the guide plate 25 and screw in the joint between the threaded end 14 of the hub 11 and the inner threaded end 15 of the dust cap 16 to prevent the latter from unscrewing on the hub 11. The guide plate 25 is provided with bearings 30 in register with the bolt holes 22 and in such bearings 30 are mounted to slide bolts 31 attached to a bolt arm 32 mounted to slide lengthwise on a shaft 33 attached at its inner end to the center of the guide plate 25.

Between the guide plate 25 and the bolt arm 32 is arranged a bolt controller 35 rotating with the shaft 33 by being centrally fastened thereon by a polygonal central aperture in the controller engaging a polygonal portion 36 formed on the shaft 33, but I do not limit myself to this means of fastening the controller 35 to the shaft 33. The controller 35 is provided with cam faces 38 and 39 engaging the back of the bolt arm 32 to move the latter outward against the tension of a spring 40 bearing against the front face of the bolt arm 32. On turning the controller 35 in one direction, the spring 40 moves the bolt arm 32 inward so that the bolts 31 engage the bolt holes 22 of the keeper 20 with a view to hold the guide plate 25 against rotation and with it the dust cap 16 and the hub 11. When the controller 35 is turned in the opposite direction the bolt arm 32 is moved outwardly against the tension of the spring 40 whereby the bolts 31 are withdrawn from the bolt holes 22 thus unlocking the guide plate 25 and allowing the latter to rotate with the dust cap 26 fastened on the hub 11.

The forward end 45 of the shaft 33 is made polygonal and extends into a correspondingly shaped socket 46 formed centrally in the barrel 47 of a tumbler lock 48 controlled by a key 49 and mounted in the plug 17. The tumbler lock 48 may be of any approved construction and inserting the proper key 49 and turning the barrel 47 causes a turning of the shaft 33 for rotating the bolt controller 35 for the purpose above described. Thus the person in charge of the vehicle, by the use of the key 49, can readily lock the hub 11 to the axle 10 to prevent the vehicle from being stolen, or unlock the said hub whenever it is desired to run the vehicle in the usual manner.

In order to prevent the plug 17 from being unscrewed, by unauthorized persons, from the dust cap 16 to gain access to the shaft 33, the following arrangement is made: On the inner face of the plug 17 are fulcrumed locking levers 50 pressed on by springs 51 and adapted to engage at their outer ends the grooves 27 formed in the dust cap 16 (see Figs. 1 and 5). The inner ends of the levers 50 engage the inner end of the barrel 47 and the latter is provided on its peripheral face with lugs 53 adapted to engage the inner ends of the levers 50 to swing their outer ends out of engagement with the grooves 27 thus allowing the proper person to unscrew the plug 17 from the dust cap 16 whenever it is desired to gain access to the locking mechanism within the dust cap. It is understood that the lugs 52 are so arranged relative to the cam faces 38 and 39 that the lugs 52 and 53 do not actuate the levers 50 in the ordinary turning of the barrel 47 and shaft 33 for locking and unlocking the wheel hub, as above explained. In order to unlock the plug 17 it is necessary for the user to turn the barrel 47 a quarter farther (see Fig. 3) to move the lugs 50 and 53 in unlocking engagement with the levers 50.

From the foregoing it will be seen that by the arrangement described the person in charge of the vehicle can readily lock the wheel to the axle to prevent rotation of the wheel and thus safeguard the vehicle against being stolen.

It will also be noticed that the locking mechanism shown and described is very simple and durable in construction and by being mounted in the dust cap a safe mounting is provided to prevent the parts from being injured.

It will further be noticed that convenient access can be had to the parts by the possessor of the proper key to permit inspection and repairs of the lock whenever it is deemed necessary.

Having thus described my invention, I claim as new and desire to secure by Letters Patent:—

1. In a vehicle lock for locking the hub of a wheel to the axle nut, a keeper fitting the axle nut, a guide plate fixed to the hub and arranged in front of the keeper, a spring-pressed bolt slidable in the said plate and adapted to engage the said keeper, a bolt controller having cam faces engaging the said bolt, and key-controlled mechanism mounted in the outer end of the hub and controlling the said bolt controller.

2. In a vehicle lock for locking the hub of a wheel to the axle nut, a keeper fitting the axle nut and provided with a bolt hole, a guide plate secured to the hub and provided with bearings in register with the said bolt hole, a bolt slidable in the said plate and adapted to engage the said bolt hole, a shaft mounted to turn in the said plate, a bolt controller secured on the said shaft and controlling the said bolt, and a key-controlled mechanism arranged in the outer end of the hub and engaging the said shaft to turn the latter.

3. In a vehicle lock for locking the hub of a wheel to the axle nut, a keeper fitting the axle nut and provided with a bolt hole and with a cam groove leading from the face of the plate to the bolt hole, a guide plate secured to the hub and provided with bearings in register with the said bolt hole, a bolt slidable in the said plate and adapted to engage the said bolt hole, a shaft mounted to turn in the said plate, a bolt controller secured on the said shaft and controlling the said bolt, and a key-controlled mechanism arranged in the outer end of the hub and engaging the said shaft to turn the latter.

4. In a vehicle lock, the combination of a wheel hub having a dust cap provided with a body and with a closing plug screwing in the body, an axle on which the hub is mounted to turn and provided with a nut, a keeper fitting the said nut, a guide plate held on the body of the dust cap in front of the said keeper, a bolt arm provided with bolts slidable in the said guide plate and adapted to engage the said keeper, a bolt controller having cam faces engaging the said bolt arm, a shaft mounted to turn in the said guide plate and carrying the said bolt controller, a key-controlled mechanism mounted in the said dust cap plug and engaging the said shaft to turn the latter, and a spring pressing the said bolt arm.

5. In a vehicle lock, the combination of a wheel hub having a dust cap provided with a body and with a closing plug screwing in the body, an axle on which the hub is mounted to turn and provided with a nut, a keeper fitting the said nut, a guide plate held on the body of the dust cap in front of the said keeper, a bolt arm provided with bolts slidable in the said guide plate and adapted to engage the said keeper, a bolt controller having cam faces engaging the said bolt arm, a shaft mounted to turn in the said guide plate and carrying the said bolt controller, a key-controlled mechanism mounted in the said dust cap plug and engaging the said shaft to turn the latter, a spring pressing the said bolt arm, and a locking device controlled by the said key-controlled mechanism and mounted on the back of the said plug to lock the latter to the dust cap body.

6. In a vehicle lock, the combination of a wheel hub having a dust cap provided with a body and with a closing plug screwing in the body, an axle on which the hub is mounted to turn and provided with a nut, a keeper fitting the said nut, a guide plate held on the body of the dust cap in front of the said keeper, a bolt arm provided with bolts slidable in the said guide plate and adapted to engage the said keeper, a bolt controller having cam faces engaging the said bolt arm, a shaft mounted to turn in the said guide plate and carrying the said bolt controller, a key-controlled mechanism mounted in the said dust cap plug and engaging the said shaft to turn the latter, a spring pressing the said bolt arm, and means held on the said guide plate and engaging the joint between the dust cap body and the hub to lock the dust cap in place.

7. In a vehicle lock, the combination of an axle having a nut, a wheel hub mounted to turn on the axle, a dust cap screwed on the hub and having a closing plug, screws screwing into the joint between the hub and dust cap, a member in the dust cap and engaging the nut, a key controlled mechanism mounted in the said plug, and a locking device within the dust cap and engaging the said member, the said locking device being controlled by the said key-controlled mechanism.

8. In a vehicle lock, the combination of an axle having a nut, a wheel hub mounted to turn on the axle, a dust cap screwed on the hub and having a closing plug, screws screwing into the joint between the hub and dust cap, a member in the dust cap and engaging the nut, a key-controlled mechanism mounted in the said plug, a locking device within the dust cap and engaging the said member, the said locking device being controlled by the said key-controlled mechanism, and a locking device within the said dust cap and locking the said plug to the said dust cap, the said last mentioned locking device being controlled by the said key-controlled mechanism.

9. A vehicle locking device, comprising a body member adapted to be mounted on the hub of a wheel, a locking element on said member that is adapted to coöperate with a part carried by the spindle or axle on which the wheel turns, a key-controlled means for governing the position of said locking element, a removable device for securing said body member to the hub of the wheel, and means governed by said key-controlled means for preventing the removable device from being withdrawn so as to release said body member.

10. A vehicle locking device, comprising a body member that is adapted to be mounted on the hub of a wheel, a locking element on said member that is adapted to coöperate with a part carried by the spindle or axle on which the wheel turns, and a key-controlled means for locking said body member on the hub of the wheel and for governing the position of said locking element.

11. A vehicle locking device, comprising a body member that is adapted to be screwed onto the hub of a wheel in place of the usual hub cap, a locking element on said body member, a key controlled means for governing the position of said locking element, and a coöperating part for said locking element that is adapted to be slipped over the wheel retaining nut on the spindle on which the wheel is mounted.

LOUIS MOREFORD EGBERT.